(12) United States Patent
Min et al.

(10) Patent No.: US 11,014,523 B2
(45) Date of Patent: May 25, 2021

(54) AIRBAG DEVICE FOR PANORAMA ROOF

(71) Applicant: Hyundai Mobis Co., Ltd., Seoul (KR)

(72) Inventors: Byung Ho Min, Seoul (KR); Sang Won Hwangbo, Goyang-si (KR); Kyu Sang Lee, Yongin-si (KR); Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 33 days.

(21) Appl. No.: 16/216,505

(22) Filed: Dec. 11, 2018

(65) Prior Publication Data

US 2019/0184930 A1    Jun. 20, 2019

(30) Foreign Application Priority Data

Dec. 14, 2017  (KR) .......................... 10-2017-0172610

(51) Int. Cl.

| | |
|---|---|
| *B60R 21/261* | (2011.01) |
| *B60R 21/213* | (2011.01) |
| *B60R 21/214* | (2011.01) |
| *B60R 21/217* | (2011.01) |
| *B60R 21/231* | (2011.01) |
| *B60R 21/00* | (2006.01) |
| *B60R 21/16* | (2006.01) |
| *B60R 21/04* | (2006.01) |

(52) U.S. Cl.
CPC .......... *B60R 21/261* (2013.01); *B60R 21/213* (2013.01); *B60R 21/214* (2013.01); *B60R 21/2176* (2013.01); *B60R 21/231* (2013.01); *B60R 2021/0018* (2013.01); *B60R 2021/0442* (2013.01); *B60R 2021/161* (2013.01); *B60R 2021/23192* (2013.01); *B60R 2021/2612* (2013.01)

(58) Field of Classification Search
CPC ............ B60R 21/213; B60R 2021/028; B60R 2021/0018; B60R 2021/23192; B60R 21/214; B60R 2021/0442; B60J 7/043
See application file for complete search history.

(56) References Cited

U.S. PATENT DOCUMENTS

| | | | |
|---|---|---|---|
| 6,189,960 B1 * | 2/2001 | Mumura ................. | B60J 7/0015 160/7 |
| 6,241,278 B1 * | 6/2001 | Roote .................... | B60R 21/213 280/728.2 |
| 6,971,704 B2 * | 12/2005 | Cocaign ................. | B62D 25/06 296/215 |
| 8,366,187 B2 * | 2/2013 | Mihashi ................. | B60J 7/0435 296/214 |

(Continued)

FOREIGN PATENT DOCUMENTS

KR    1020170049651 A  *  5/2017

*Primary Examiner* — Paul N Dickson
*Assistant Examiner* — Joselynn Y Sliteris
(74) *Attorney, Agent, or Firm* — H.C. Park & Associates, PLC

(57) ABSTRACT

An airbag device for a panorama roof may include: a roller disposed under a panorama roof and having a blind wound therearound, the blind serving to cover the panorama roof; a head liner covering the roller; an inflator disposed at sides of the panorama roof; a guide tunnel connected to the inflator to guide gas; and a cushion connected to the guide tunnel, and deployed by gas guided through the guide tunnel so as to cover the panorama roof.

8 Claims, 4 Drawing Sheets

(56) References Cited

U.S. PATENT DOCUMENTS

| | | | | |
|---|---|---|---|---|
| 8,845,013 B2* | 9/2014 | Lee | ............... | B60J 1/2019 |
| | | | | 160/241 |
| 9,610,915 B2* | 4/2017 | Specht | ............... | B60R 21/214 |
| 10,071,617 B1* | 9/2018 | Serebrennikov | ....... | B60J 7/0015 |
| 10,399,527 B2* | 9/2019 | Schutt | ............... | B60R 21/08 |
| 10,427,637 B2* | 10/2019 | Raikar | ............... | B60R 21/013 |
| 2002/0167202 A1* | 11/2002 | Pfalzgraf | ............... | B60J 7/0015 |
| | | | | 296/214 |
| 2017/0267199 A1* | 9/2017 | Schutt | ............... | B60R 21/08 |
| 2018/0162315 A1* | 6/2018 | Lee | ............... | B60R 21/233 |
| 2019/0184927 A1* | 6/2019 | Park | ............... | B60R 21/231 |

* cited by examiner

AIRBAG DEVICE FOR PANORAMA ROOF

CROSS-REFERENCES TO RELATED APPLICATION

The present application claims priority from and the benefit of Korean Patent Application No. 10-2017-0172610, filed on Dec. 14, 2017, which is hereby incorporated by reference for all purposes as if set forth herein.

BACKGROUND

Field

Exemplary embodiments relate to an airbag apparatus for a panorama roof, and more particularly, to an airbag device for a panorama roof, which can prevent a passenger from being injured or thrown to the outside even when the roof of a vehicle is damaged in case of a rollover accident of the vehicle.

Discussion of the Background

In general, a vehicle transports passengers. The vehicle has airbag devices to protect passengers. For example, the airbag devices are installed at the front, both sides and the top of the vehicle. Each of the airbag devices includes an inflator and an airbag. When a certain magnitude of external shock is applied to the vehicle, the airbag is expanded while gas generated from the inflator is injected into the airbag. The airbag is rapidly expanded to protect the body of a passenger. When the vehicle is turned over, the airbag installed at the top of the vehicle is expanded. The airbag is deployed toward the center from both sides of a panorama roof.

In the related art, since the airbag at the top of the vehicle is deployed toward the center from both sides of the panorama roof, the center of the panorama roof may not be completely covered by the airbag, which increases the possibility that a passenger will be injured. Furthermore, since the support force of the airbag is weak in the center of the panorama roof, the airbag may be separated from the center of the panorama roof. Therefore, there is a demand for a device capable of solving the problems.

The above information disclosed in this Background section is only for enhancement of understanding of the background of the invention and, therefore, it may contain information that does not constitute prior art.

SUMMARY

Exemplary embodiments of the present invention are directed to an airbag device for a panorama roof, which can prevent a passenger from being injured or thrown to the outside even when the roof of a vehicle is damaged in case of a rollover accident of the vehicle.

In one embodiment, an airbag device for a panorama roof may include: a roller disposed under a panorama roof and having a blind wound therearound, the blind serving to cover the panorama roof; a head liner covering the roller; an inflator disposed at sides of the panorama roof; a guide tunnel connected to the inflator to guide gas; and a cushion connected to the guide tunnel, and deployed by gas guided through the guide tunnel so as to cover the panorama roof.

The inflator may include: gas generation parts disposed at both sides of the panorama roof in the longitudinal direction, respectively, and connected to the guide tunnel so as to supply gas to the guide tunnel; and a gas fixing part fixing the gas generation parts to both sides of the panorama roof, respectively.

The guide tunnel may be formed of a harder material than the cushion.

The cushion may include: a cushion deployment part folded and disposed above the head liner, and expanded and deployed by gas supplied from the inflator; and a cushion support part supporting the cushion deployment part.

The cushion support part may include: a support guide part disposed above the blind and supporting the cushion deployment part; and a support coupling part connected to the support guide part and mounted on the panorama roof.

The support guide part may support both side surfaces of the cushion deployment part so as to limit side-to-side movement of the cushion deployment part.

The support guide part may support the rear surface of the cushion deployment part so as to limit backward deployment of the cushion deployment part.

The cushion deployment part may be disposed at an end of the head liner.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
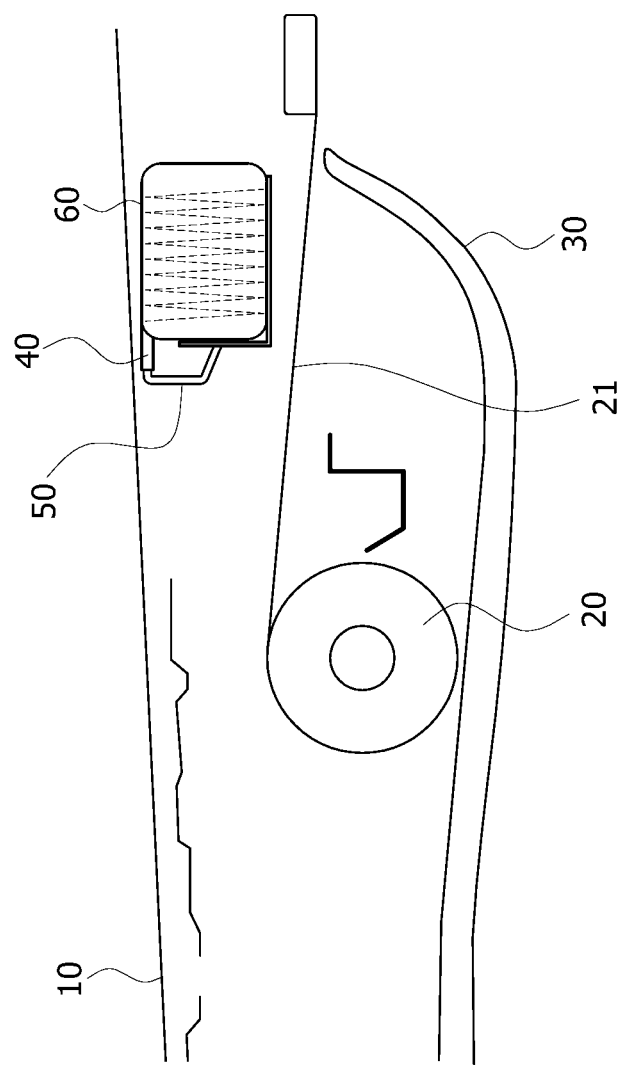
FIG. 1 schematically illustrates an airbag device for a panorama roof in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an airbag device for a panorama roof in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
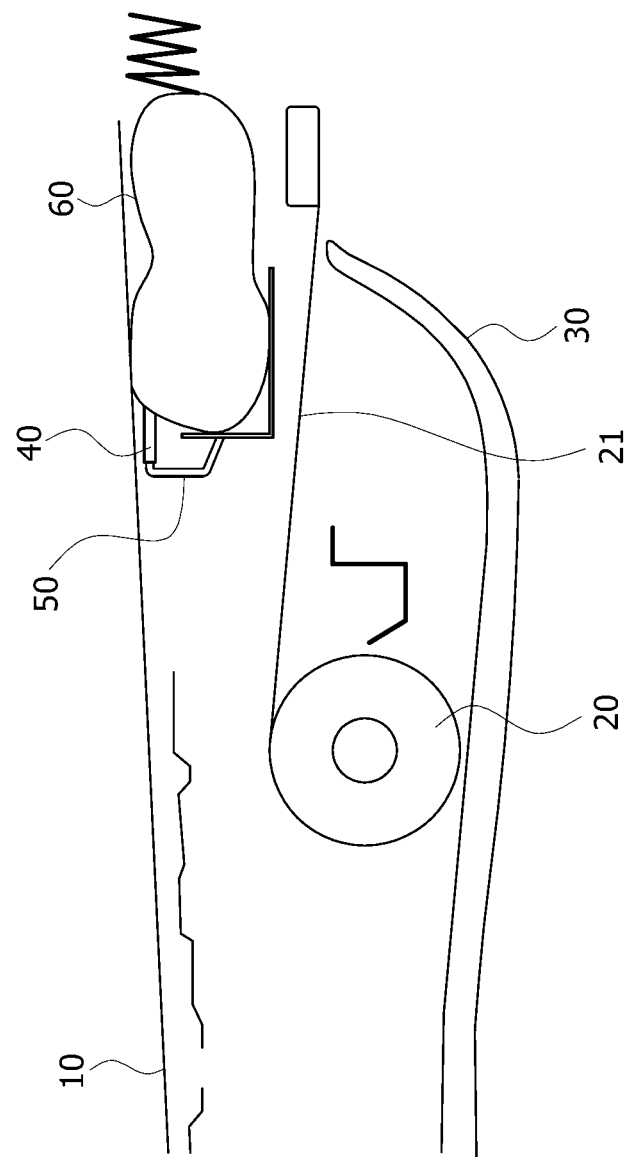
FIG. 2 schematically illustrates that the airbag device for a panorama roof in accordance with the exemplary embodiment of the present invention is operated.

FIG. 1 schematically illustrates an airbag device for a panorama roof in accordance with an exemplary embodiment of the present invention, and FIG. 2 schematically illustrates that the airbag device for a panorama roof in accordance with the exemplary embodiment of the present invention is operated. Referring to FIGS. 1 and 2, the airbag device 1 for a panorama roof in accordance with the exemplary embodiment of the present invention may include a panorama roof 10, a roller 20, a head liner 30, an inflator 40, a guide tunnel 50 and a cushion 60.

The panorama roof 10 may be disposed at the ceiling of a vehicle. The panorama roof 10 may include two lines of windows. When the window at the first line is slid, the panorama roof may provide a sense of openness. Hereafter, the window at the first line will be referred to as a first window, and the window at the second line will be referred to as a second window.

The roller 20 may be disposed under the panorama roof 10, and a blind 21 for covering the panorama roof 10 may be wound around the roller 20. For example, when the blind 21 wound around the roller 20 is unwound to move to the front end of the panorama roof 10, the blind 21 may cover the first and second windows of the panorama roof 10.

The head liner 30 may cover the roller 20. For example, the head liner 30 may indicate an interior material of the vehicle, and limit the exposure of the roller 20 to the outside. The blind 21 may be moved over an end of the head liner 30.

The inflator 40 may be disposed at sides of the panorama roof 10, the guide tunnel 50 may be connected to the inflator 40 to guide gas, and the cushion 60 may be connected to the guide tunnel 50. The cushion 60 may be covered by the head liner 30, and deployed by the gas guided through the guide tunnel 50 so as to cover the panorama roof 10. For example, the guide tunnel 50 and the cushion 60 may be integrated with each other.

Therefore, the gas discharged from the inflator 40 may pass through the guide tunnel 50 and deploy the cushion 60. At this time, the cushion 60 may be disposed adjacent to the end of the head liner 30, and thus rapidly cover the panorama roof 10.

Figure 3:
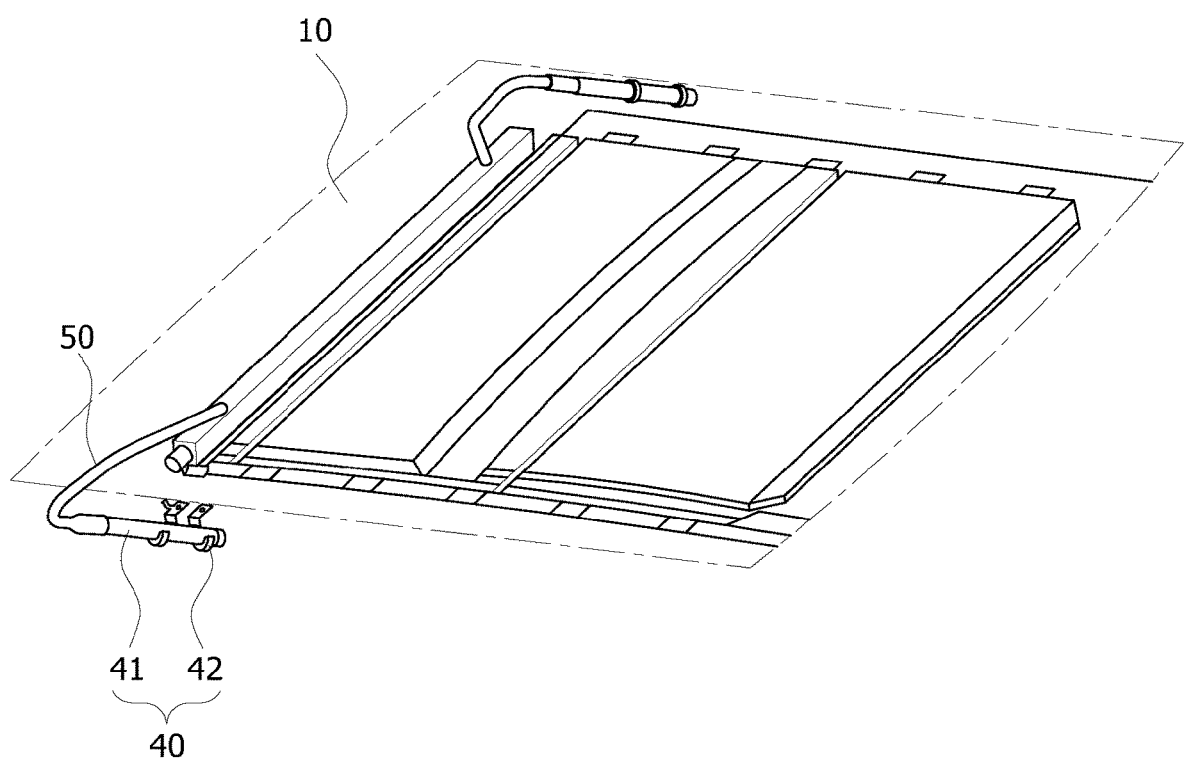
FIG. 3 schematically illustrates an inflator of the airbag device for a panorama roof in accordance with the exemplary embodiment of the present invention.

FIG. 3 schematically illustrates the inflator of the airbag device for a panorama roof in accordance with the exemplary embodiment of the present invention. Referring to FIG. 3, the inflator 40 in accordance with the exemplary embodiment of the present invention may include a gas generation part 41 and a gas fixing part 42.

The gas generation part 41 may be exploded to discharge gas, when a vehicle collision signal is received. The guide tunnel 50 may be connected to a discharge port of the gas generation part 41, and expanded by the discharged gas. For example, the gas generation part 41 may be disposed at both edges of the frame of the panorama roof 10.

The gas fixing part 42 may fix the gas generation parts 41 to both sides of the panorama roof 10, respectively. For example, the gas fixing part 42 may be coupled to the outside of the gas generation part 41, and screwed to the rears of both edges of the frame of the panorama roof 10. The gas fixing part 42 may be covered by the head liner 30.

The gas generation parts 41 may be disposed at both edges of the panorama roof 10, respectively, and the cushion 60 may be disposed in the center of the panorama roof 10 and have a length corresponding to the width of the first and second windows. The guide tunnel 50 may connect the gas generation part 41 and the cushion 60 so as to guide gas. Since the guide tunnel 50 includes a harder material than the cushion 60, the guide tunnel 50 may be suppressed from being deformed and induce the gas to move to the cushion 60, while the gas is supplied. In addition, the guide tunnel 50 may include the same material as the cushion 60.

Figure 4:
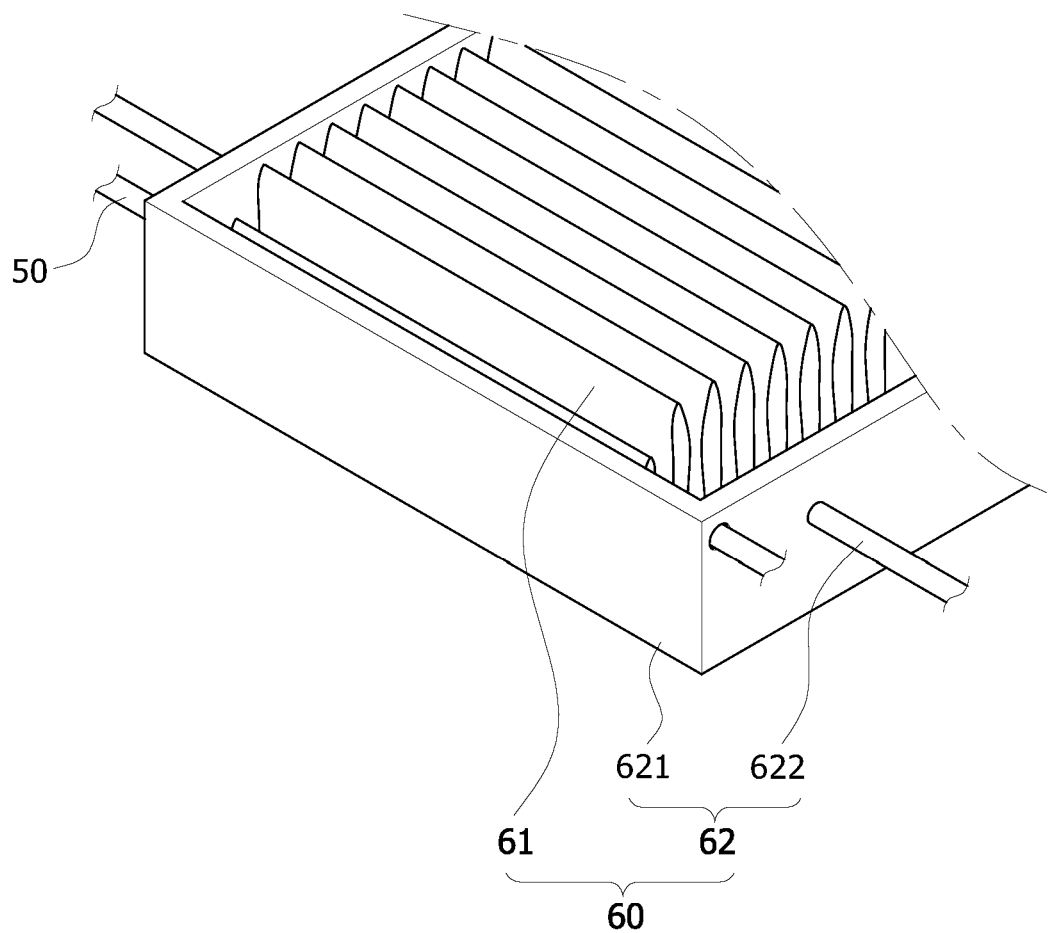
FIG. 4 schematically illustrates a cushion of the airbag device for a panorama roof in accordance with the exemplary embodiment of the present invention.

FIG. 4 schematically illustrates the cushion of the airbag device for a panorama roof in accordance with the exemplary embodiment of the present invention. Referring to FIG. 4, the cushion 60 in accordance with the exemplary embodiment of the present invention may include a cushion deployment part 61 and a cushion support part 62.

The cushion deployment part 61 may be folded and connected to the guide tunnel 50 before deployed. The cushion deployment part 61 may be disposed above the end of the head liner 30. For example, the cushion deployment part 61 may be disposed above the end of the head liner 30, and the blind 21 may be disposed between the head liner 30 and the cushion deployment part 61.

The cushion support part 62 may support the cushion deployment part 61. The cushion support part 62 in accordance with the exemplary embodiment of the present invention may include a support guide part 621 and a support coupling part 622.

The support guide part 621 may be disposed above the blind 21, and support the cushion deployment part 61. For example, the support guide part 621 may support the bottom surface and both side surfaces of the cushion deployment part 61, and thus limit the side-to-side movement of the cushion deployment part 61. In addition, the support guide part 621 may support the bottom surface of the cushion deployment part 61, and thus limit the backward deployment of the cushion deployment part 61. At this time, the guide tunnel 50 may be connected to the cushion deployment part 61 through the support guide part 621.

The support coupling part 622 may be connected to the support guide part 621, and mounted on the panorama roof 10. For example, the support coupling part 622 may be coupled to both sides of the support guide part 621, and fixed to the frame of the panorama roof 10.

The operation of the airbag device for a panorama roof in accordance with the exemplary embodiment of the present invention will be described as follows.

The inflator 40 may be mounted at both sides of the panorama roof 10, and the roller 20 may be disposed at the front bottom of the inflator 40.

The guide tunnel 50 may be connected to the inflator 40, and the cushion 60 including the folded cushion deployment part 61 and the cushion support part 62 for supporting the cushion deployment part 61 may be disposed at the end of the guide tunnel 50. The cushion 60 may be covered by the head liner 30 so as not to be exposed to the outside, and the blind 21 which is wound around the roller 20 and unwound from the roller 20 may be disposed under the guide tunnel 50 and the cushion 60.

When a vehicle accident occurs in the above-described state, the inflator 40 receiving a sensing signal may be exploded to generate gas. The generated gas may be moved through the guide tunnel 50 and supplied to the cushion 60. The cushion 60 may be deployed by the supplied gas and sequentially cover the second window and the first window of the panorama roof 10, thereby protecting a passenger.

At this time, since the blind 21 is disposed under the cushion 60, the cushion 60 may be suppressed from being deployed downward, and rapidly deployed to the first window of the panorama roof 10.

In the airbag device 1 for a panorama roof in accordance with the exemplary embodiment of the present invention, the inflator 40 may be disposed at sides of the panorama roof 10 and covered by the head liner 30, which makes it possible to guarantee a passenger's safety when the inflator 40 is exploded.

Furthermore, since the blind 21 is disposed under the guide tunnel 50 and the cushion 60, the cushion 60 can be rapidly deployed forward while suppressed from being deployed downward.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device for a panorama roof, comprising:
   a roller disposed under a panorama roof and comprising a blind wound around the roller, the blind being configured to cover the panorama roof;
   a head liner covering the roller;
   a first inflator disposed at a first side of the panorama roof and a second inflator disposed at a second side of the panorama roof;
   a first guide tunnel connected to the first inflator and a second guide tunnel connected to the second inflator, the first and second guide tunnels configured to guide a gas; and
   a cushion connected to the guide tunnels, and the cushion being configured to be deployed by the gas guided through the guide tunnels to cover the panorama roof, wherein the cushion is disposed separate from the roller and the blind, and
   wherein the cushion is located above the roller.

2. The airbag device of claim 1, wherein the inflator comprises:
   gas generation parts disposed at both sides of the panorama roof in a longitudinal direction, respectively, and connected to the guide tunnels configured to supply the gas to the guide tunnels; and
   a gas fixing part configured to fix the gas generation parts to both sides of the panorama roof, respectively.

3. The airbag device of claim 1, wherein the guide tunnels are formed of a harder material than the cushion.

4. The airbag device of claim 1, wherein the cushion comprises:
   a cushion deployment part folded and disposed above the head liner, and configured to be expanded and deployed by the gas supplied from the inflators; and
   a cushion support part configured to support the cushion deployment part.

5. The airbag device of claim 4, wherein the cushion support part comprises:
   a support guide part disposed above the blind and configured to support the cushion deployment part; and
   a support coupling part connected to the support guide part and mounted on the panorama roof.

6. The airbag device of claim 5, wherein the support guide part is configured to support both side surfaces of the cushion deployment part to limit a side-to-side movement of the cushion deployment part.

7. The airbag device of claim 6, wherein the support guide part is configured to support a rear surface of the cushion deployment part to limit a backward deployment of the cushion deployment part.

8. The airbag device of claim 4, wherein the cushion deployment part is disposed at an end of the head liner.

\* \* \* \* \*